July 18, 1967  W. J. BAKER  3,331,583
BALANCED SHUT-OFF VALVE
Original Filed Oct. 6, 1964  2 Sheets-Sheet 1
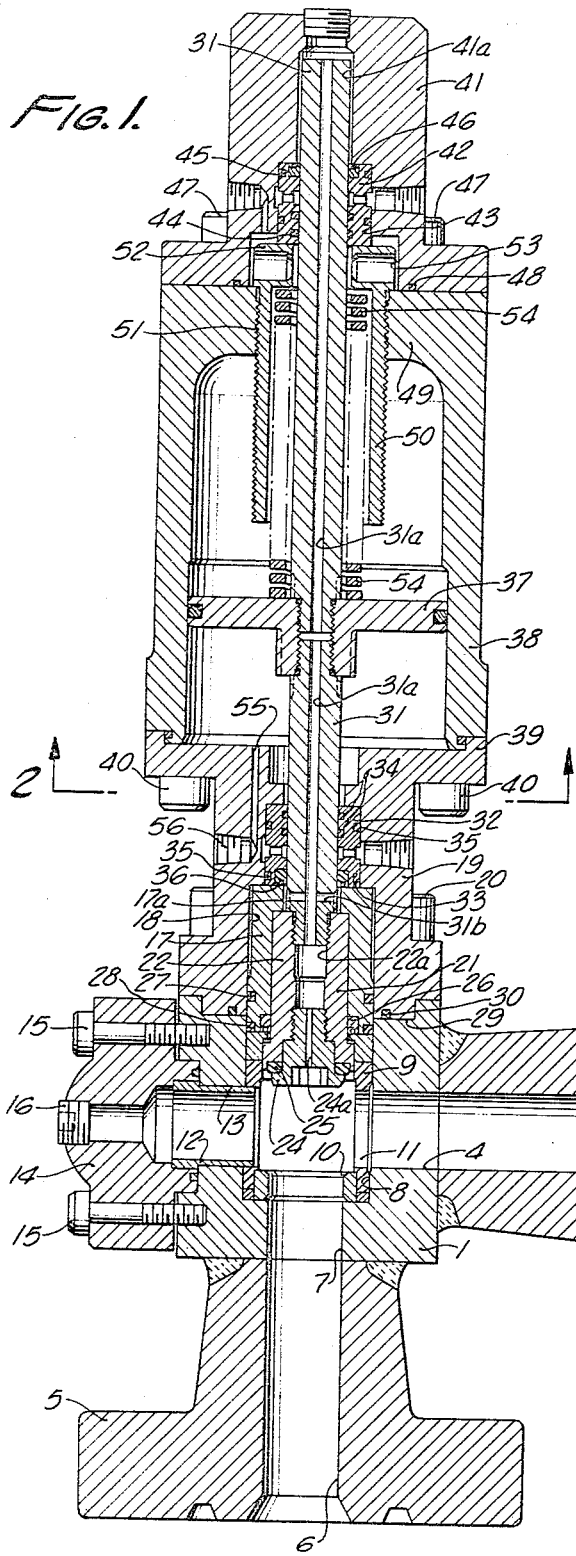
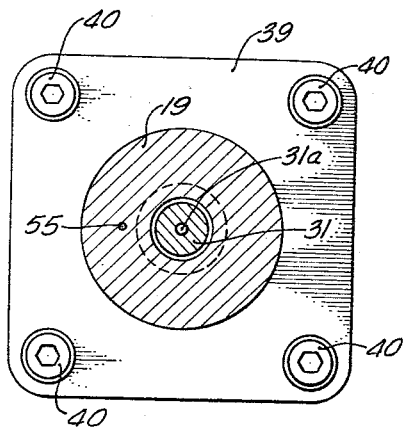
INVENTOR.
WILLIAM J. BAKER
BY
Paul A. Weilein
ATTORNEY

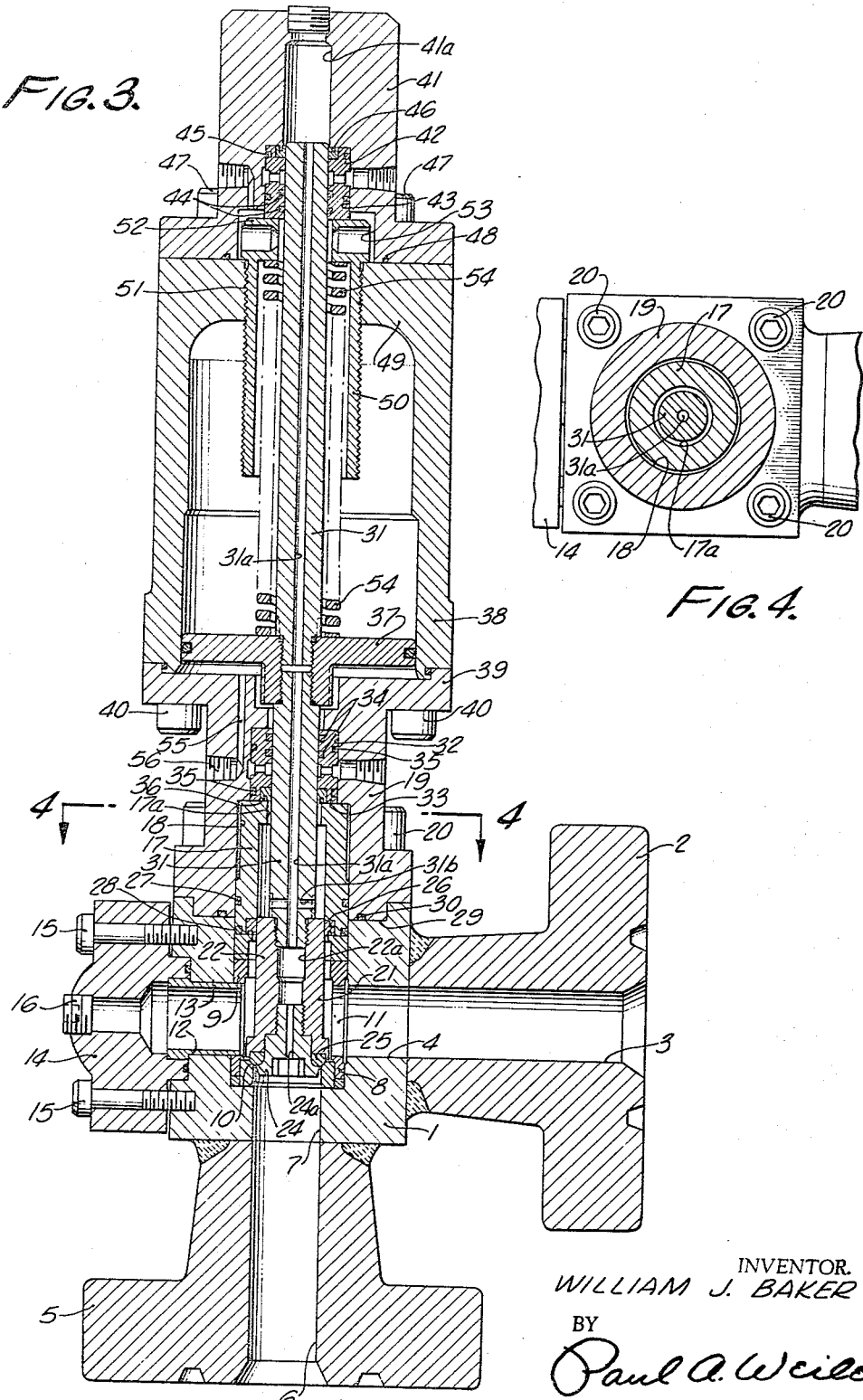

3,331,583
BALANCED SHUT-OFF VALVE
William J. Baker, Anaheim, Calif., by decree of distribution of the estate of Robert S. Willis, deceased, assignor to Elizabeth N. Willis
Continuation of application Ser. No. 401,927, Oct. 6, 1964. This application June 23, 1966, Ser. No. 564,470
8 Claims. (Cl. 251—63.5)

The present application constitutes a continuation of my co-pending application Ser. No. 401,927, filed Oct. 6, 1964, and now abandoned, for Balanced Shut-off Valve.

The present invention relates to valves and more particularly to a valve of the type that is adapted to shut off or control the flow of fluid through a flow line, for example, under manual control or automatically upon a variation in the pressure of fluid flowing through the flow line.

An object of the present invention is to provide such a valve which is not sensitive to the magnitude of the line pressure either from the standpoint of the force required to close the valve when it is open, from the standpoint of the force necessary to open the valve when it is closed, or from the standpoint of the force necessary to move the valve in any intermediate position, the valve assembly being so constructed that the movable valve member is substantially hydraulically balanced.

In the use of valves to shut off or control the flow of high pressure fluids, as for example, high pressure well production fluids, it has been the practice to provide a movable valve member which is adapted to shut off the flow upon contact with a valve seat. Where the line pressures involved are high, it is known to employ a hydraulically unbalanced valve head whereby the high line pressure is availed of as a means of supplying actuating force to the valve head to assist in closing the valve. However, in the event that the valve is closed against such high line pressure, reopening of the valve has posed a problem where the high line pressure creates a force tending to hold the valve closed.

In accordance with the present invention, the necessity for employing line pressure as a motive fluid for the valve is eliminated and also by virtue of the fact that the valve head is hydraulically balanced, small motive force is required to move the valve head to either closed or to open position no matter what may be the effective line pressure.

In accomplishing the foregoing objective, it is another object of the invention to provide a valve assembly which is certain in its operation and which is easy to assemble, repair and maintain.

Other objects and advantages of the invention will be hereinafter described or will become apparent to those skilled in the art, and the novel features of the invention will be defined in the appended claims.

In the accompanying drawings:

FIG. 1 is a longitudinal sectional view through a valve assembly made in accordance with the invention, the valve being shown open;

FIG. 2 is a transverse sectional view as taken on the line 2—2 of FIG. 1;

FIG. 3 is a view corresponding to FIG. 1, the valve being shown closed; and

FIG. 4 is a transverse sectional view as taken on the line 4—4 of FIG. 3.

Like reference characters in the several views of the drawings and in the following description designate corresponding parts.

The illustrative assembly as herein shown is seen to comprise a valve body 1 at one side of which is disposed a mounting flange 2 having an inlet passage 3 therethrough leading to an inlet port 4 in the body 1. At another side of the valve body is an attachment flange 5 having an outlet passage 6 therein communicating with an outlet port 7 in the valve body 1. The ports 4 and 7, in the body 1, communicate with a bore 8 which, in the illustrative embodiment, is normal to the axis of the inlet port and aligned with the axis of the outlet port.

Preferably, there is disposed within the bore 8 a guide sleeve 9 abutting at one end with an annular valve seat 10 which circumscribes the flow passage through the valve body leading from inlet 3 to outlet 6, the sleeve 9 has at one side a port 11 adapted to register with the inlet port 4. In the illustrative embodiment registry of ports 11 and 4 is assured by means of a tubular member 12 which is disposed in a bore 13 aligned with the port 4 and which is held in place by means of a cap 14 secured to the body 1 by suitable fasteners 15 and preferably having a plug 16 whereby access is had to the interior of the body. The guide sleeve 9 is held in engagement with the seat 10 to fix the latter at the base of the bore 8 by means of an upper tubular guide generally denoted at 17. The latter being disposed within a bore 18 in a body section 19 which is removably secured to the body 1 by means of a suitable number of fasteners 20, as best seen in in FIG. 4.

Reciprocable in the guides 9 and 17 is a valve generally denoted at 21. This valve is preferably composed of a tubular part 22 having an opening 22a therethrough and in its lower end the tubular member 22 is provided with a seal retainer 24 to support a seating ring 25 which is adapted for sealing coengagement with the valve seat 10 when the valve is closed. Inasmuch as the valve 21, as previously described, is hydraulically balanced when closed, the seating diameter of ring 25 should be the same as the diameter of valve member 22 within the seal 26.

In addition, the upper guide 17 is preferably provided with sealing means 26 for effecting a seal with the valve 21, and the guide 17 is also provided with sealing means respectively designated 27 and 28 which engage within the bore 18 at opposite sides of the parting line 29 at the juncture between the upper body section 19 and the body 1. If desired, a seal 30 may also be provided at the juncture of the body 1 and the body section 19.

Actuator means are provided for effecting reciprocation of the valve 21 from the open position shown in FIG. 1 to the closed position shown in FIG. 3. Such actuator means in the illustrative embodiment includes an elongated stem 31 threadedly connected to the upper extremity of the tubular member 22 of the valve head 21 and extended through a bore 32 in the body section 19. Within the bore 32 there is preferably provided a sealing means comprising a carrier sleeve 33 having circumferential seal rings 34 engageable with the stem 31 and having circumferential seal rings 35 engageable within the bore 32. In addition, the carrier 33 may be provided with a cup sealing ring 36 engageable with the stem 31, adjacent the end of the upper guide 17 for a purpose which will hereinafter more fully appear.

The stem 31 is shown as a two-part stem and has threadedly disposed thereon between the ends of the two stem parts an annular piston 37 which is slidably and sealingly engaged within an actuator cylinder 38. The latter is suitably connected to a flange 39 formed on the body section 19 as by means of a suitable number of fasteners 40, as best seen in FIG. 2. The stem 31 at its outer extremity extends into a closure cap assembly 41 which contains a seal carrier 42 disposed within a bore 43 of the cap and having suitable seal rings 44 engaging the stem 31 as well as suitable seal rings 45 engaging within the bore 43. In addition, the carrier 42 carries a cup seal 46 engaging the stem 31 adjacent the end of the bore 43 for a reason which will hereinafter be fully described.

The cap assembly is secured in position on the cylinder 38 by means of suitable screw fasteners 47, and means in the form of a seal ring 48 is provided for sealing co-engagement between the cylinder 38 and the cap 41.

Supported in an internal flange 49 of the cylinder 38 is an actuator spring seat and guide member in the form of an elongated tubular body 50 threadedly engaged as at 51 in the flange 49 and having an end 52 disposed within a chamber 53 in the cap 41. Interposed between the end 52 of the seat and guide is an elongated coiled spring 54 which abuts at one end with the portion 52 of the seat and guide and which abuts at its other end with the actuator piston 37. Accordingly, it will be appreciated that there is a constant spring force acting in a direction to move the valve 21 in a direction toward the seat 10.

A fluid passage 55 is provided in the body section 19 leading into the cylinder 38 at the side of piston 37 opposite the spring 54 and an inlet port 56 in the body section 19 is adapted to be connected with a source of actuator fluid under pressure whereby a variable fluid pressure may be applied to the piston 37 in opposition to the constant spring force.

As one of the features of the invention, the present valve is hydraulically balanced so that the line pressure, namely, the pressure of fluid flow through the inlet passage 3 to the outlet passage 6 need not be overcome in order to close the valve and need not be employed as a source of pressure to assist in closing the valve and whereby when the valve is closed, no matter what may be the magnitude of the line pressure in the inlet passage 3 the valve may be easily opened. Accordingly, it will be noted that valve 21 is ported longitudinally. Illustratively, the seal retainer 24 has a passage 24a therethrough leading into the opening 22a in the tubular valve member 22. In addition, the actuator stem 31 has a passage 31a communicating with the opening 22a at one end and leading through the piston 37 and into a chamber 41a in the cap 41.

Adjacent the point of connection of the stem 31 to the valve member 22 there is a transverse port 31b which establishes communication between the passage 31a and a chamber 17a defined between the above mentioned cup seal 36, the stem 31 and the tubular valve member 22.

It will now be understood that whatever fluid pressure exists at the head end of the valve adjacent the seal retainer 24, will find access through passage 24a, opening 22a, and passage 31a into chamber 41a at the outer extremity of the stem 31 and through the transverse port 31b into chamber 17a so that the valve 21 is effectively subjected to the same fluid pressure at its opposite ends so that no matter what may be the magnitude of that fluid pressure, it neither has an effect tending to close the valve, nor an effect tending to open the valve nor an effect tending to hold the valve in either an open or in a closed position. Therefore, operation of the valve is a simple function of the force applied to the piston 37 by the spring 54 and the force applied to the piston 37 by fluid pressure through passage 55 in opposition to the spring 54.

In the practical application of the valve described above to the control of the flow of fluid through the valve body 1, the body will be installed in a flow line and a source of pressure fluid will be connected to the inlet 56 so as to pressurize the cylinder 38 at the lower side of piston 37 as seen in FIG. 1, the pressure fluid being employed to overcome spring 54 so that the valve will be held in the open position. The valve may be closed at will by venting the source of pressure control fluid or may be automatically closed by the use of suitable automatic control instrumentalities (not shown) well known in the art whereby to automatically vent the cylinder 38 beneath the piston 37 upon some predetermined variation in the flow or pressure of fluid passing through the valve body.

In any event, when the cylinder 38 is vented to atmosphere, or when the pressure in the cylinder is reduced so that the upward force applied to the piston 37 is less than the spring force acting downwardly on the piston, the valve head 21 will be moved downwardly from the position shown in FIG. 1 to the closed position shown in FIG. 3. No matter what may be the pressure of fluid flowing through the assembly when the valve is open or at the inlet side of the valve when it is closed, the valve 21 may be easily closed by a small spring force and easily raised off its seat by the application of sufficient pressure to the cylinder 38 to overcome the downward spring force of the spring 54.

From the foregoing, it will now be apparent that the present invention provides an easily operable valve which is insensitive to line pressures and which therefore is easily operated by small operating forces and in addition the structure is one which is simple to assemble and maintain. It will be recognized that such simplicity, ease of assembly, and maintenance of the valve assembly, is the result of the fact that the body section 19 upon removal of the fasteners 20 will separate from the body 1 on the parting line 39, and the entire operating valve mechanism including the upper guide 17 and the valve 21 as well as all of the actuator means therefor, being maintained in assembly with the body section 19. By virtue of this construction the entire operating mechanism may be removed and replaced without requiring disassembly of the body 1 from the flow line. Moreover, it will be observed that when the actuator mechanism is removed, valve seats 10, valve guides 17, members 22 and seating elements 25 of different diameters may be assembled in and with the body 1 and body section 19, respectively, so as to enable use of the assembly in flow lines of various capacities, without regard to the pressures involved since the valve head is hydraulically balanced.

While specific structural details have been shown and described, it should be understood that changes and alterations may be resorted to without departing from the spirit of the invention as defined in the appended claims.

I claim:
1. A shut-off valve assembly comprising: a valve body having an inlet passage and an outlet passage, a valve seat circumscribing said outlet passage, movable valve means supported for movement into and out of engagement with said seat and including a head engageable with said seat and an actuator stem having said head at one end and having a free end, means providing a pressure chamber at said free end of said stem, a passage leading through said head and said stem to expose said free end to pressure of fluid flowing through said seat and downstream of said seat when said head is off said seat and engaged with said seat, respectively, said head and said stem having opposing areas exposed to fluid pressures in said inlet and outlet passages and in said stem chamber, whereby said movable valve means is always pressure balanced, and actuator means for moving said stem to effect said movement of said movable valve means, said actuator means comprising a piston connected to said stem intermediate its ends, a housing in which said piston is reciprocable, a spring in said housing at one side of said piston and biasing said valve means in a direction to engage said seat with said head, and means for admitting fluid pressure into said housing at the other side of said piston to move said valve means out of engagement with said seat.

2. A shut-off valve as defined in claim 1 including means removably connecting said housing to said body, said body having a bore coaxial with said stem and a guide disposed in said bore, said valve means extending through said guide.

3. A shut-off valve assembly comprising: a valve body having an inlet passage and an outlet passage, a valve seat circumscribing said outlet passage, a valve member shiftably supported in said body for movement in opposite directions into and out of engagement with said seat, a passage extending through said valve member and communicating with said outlet passage when said valve member is engaged with said seat and with said inlet passage when said valve member is out of engagement with said seat, an actuator stem connected to said valve member and having a free end projecting from said valve member, means providing a pressure chamber at said free end of said stem, said valve member having opposing end areas both exposed to fluid pressure in said outlet passage when said member is in engagement with said seat and with said inlet passage when said member is out of engagement with said seat, means for admitting the pressure of fluid in the passage through said valve member to said chamber for balancing said stem and said valve member when said valve member is in and out of engagement with said seat, and actuator means between said valve member and said chamber for actuating said stem to move said valve member into and out of engagement with said seat, the area of the free end of said stem and that end area of said valve member opposite the seating end thereof being substantially equal to the area within said valve seat.

4. A shut-off valve assembly comprising: a valve body having an inlet passage and an outlet passage, a valve seat circumscribing said outlet passage, a valve member shiftably supported in said body for movement in opposite directions into and out of engagement with said seat, a passage extending through said valve member and communicating with said outlet passage when said valve member is engaged with said seat and with said inlet passage when said valve member is out of engagement with said seat, an actuator stem connected to said valve member and having a free end projecting from said valve member, means providing a pressure chamber at said free end of said stem and said valve member when said valve member is in and out of engagement with said seat, means for admitting the pressure of fluid in the passage through said valve member to said chamber for balancing said stem, a piston on said stem between said valve member and said chamber, an actuator cylinder in which said piston is reciprocable to move said valve member into and out of engagement with said seat, said valve member having opposing end areas both exposed to fluid pressure in said outlet passage when said member is in engagement with said seat and with said inlet passage when said member is out of engagement with said seat, an actuator fluid inlet in said cylinder at one side of said piston, and means for applying a force to said stem opposing the force tending to move said stem in one direction upon the admission of actuator fluid into said cylinder, the area of the free end of said stem and that end area of said valve member opposite the seating end thereof being substantially equal to the area within said valve seat.

5. A shut-off valve assembly comprising: a valve body having an inlet passage and an outlet passage, a valve seat circumscribing said outlet passage, a valve member reciprocable in said body and having a seating portion at one end movable into and out of engagement with said seat, and actuator means for effecting reciprocation of said valve member, said actuator means including a stem smaller than said valve member connected at the other end to said valve member and having a free end projecting from said valve member, a valve chamber in said body at the other end of said valve member, seal means between said body and said valve member separating said valve chamber from said seating portion of said valve member, passage means opening through said seating end of said valve member and leading to said valve chamber to equalize the pressure applicable to said seating portion and to said valve member in said valve chamber, an actuator cylinder on said body, said stem having a piston in said cylinder, said cylinder having at one side of said piston a pressure fluid inlet, and means for forcing said piston and said stem opposite to the force applied to said piston upon admission of pressure fluid through said pressure fluid inlet; means defining a stem chamber in which said free end of said stem is disposed; and means for establishing communication between said stem chamber and the pressure acting on the seating portion of said valve member to balance said stem, the area of said free end of said stem and the exposed end area of said valve member in said valve chamber being equal to the area within said valve seat.

6. A shut-off valve assembly comprising: a valve body having an inlet passage and an outlet passage, a valve seat circumscribing said outlet passage, a valve member reciprocable in said body and having a seating portion movable into and out of engagement with said seat, and actuator means for effecting reciprocation of said valve member, said actuator means including a stem connected at one end to said valve member, a valve chamber in said body, seal means between said body and said valve member separating said valve chamber from said seating portion of said valve member, passage means opening in said seating portion of said valve member and leading to said valve chamber to equalize the pressure applicable to said seating portion and to said valve member in said chamber, an actuator cylinder on said body, said stem having a piston in said cylinder, said cylinder having at one side of said piston a pressure fluid inlet, said cylinder having at the other side of said piston a stem chamber in which the end of said stem is disposed, sealing means separating said stem chamber from said cylinder, and said passage means leading through said stem and said piston into said stem chamber to equalize the pressure applied to said valve member in said valve chamber and to said end of said stem, and means for forcing said piston and said stem opposite to the force applied to said piston upon admission of pressure fluid through said pressure fluid inlet.

7. A shut-off valve assembly comprising: a valve body having an inlet passage and an outlet passage, a valve seat circumscribing said outlet passage, a valve member reciprocable in said body and having a seating portion movable into and out of engagement with said seat, and actuator means for effecting reciprocation of said valve member, said actuator means including a stem connected at one end to said valve member and having a free end projecting from said valve member, a valve chamber in said body, seal means between said body and said valve member separating said valve chamber from said seating portion of said valve member, passage means opening in said seating portion of said valve member and leading to said valve chamber to equalize the pressure applicable to said seating portion and to said valve member in said chamber, an actuator cylinder on said body, said stem having a piston in said cylinder, said cylinder having at one side of said piston a pressure fluid inlet, and a spring in said cylinder at said other side of said piston forcing said piston and stem opposite to the force applied to said piston upon admission of pressure fluid through said pressure fluid inlet; means defining a stem chamber in which said free end of said stem is disposed; and means for establishing communication between said stem chamber and the pressure acting on the seating portion of said valve member to balance said stem.

8. A shut-off valve comprising: a valve body having an inlet and an outlet and a flow passage leading from said inlet to said outlet, an annular valve seat circumscribing said flow passage, a valve member having an annular seating portion, a body member on said body having means supporting said valve member for movement of said seating portion into and out of engagement with said seat, means removably connecting said body member to said body, actuator means carried by said body member including an actuator stem having one end connected to said valve member and having a free end projecting from said valve member, means for effecting reciprocation of said stem, said body member having guide means for said valve member, sealing means forming a valve chamber in said body member at the opposite end of said valve member from said seating portion, passage means leading through said seating portion of said valve member and into said valve chamber for equalizing the pressure on said valve member when it is engaged with said seat and when it is off said seat, means on said body member forming a stem chamber in which the free end of said stem is disposed, and said passage means leading also through said stem into said stem chamber to equalize the pressure acting on said stem and on said valve member.

References Cited

UNITED STATES PATENTS

| | | | |
|---|---|---|---|
| 531,682 | 1/1895 | Hunter | 251—282 |
| 2,920,859 | 1/1960 | Holmes | 251—282 |
| 2,931,616 | 4/1960 | White et al. | 251—282 X |
| 3,214,134 | 10/1965 | Noakes | 251—282 |

M. CARY NELSON, *Primary Examiner.*

ARNOLD ROSENTHAL, *Examiner.*